United States Patent [19]

Jeffery et al.

[11] Patent Number: 5,417,368
[45] Date of Patent: May 23, 1995

[54] LEAVING AIR TEMPERATURE CONTROL OF HEATING SYSTEM

[75] Inventors: Harold L. Jeffery, Ft. Wayne, Ind.; Harrison T. Hickenlooper, III, Palatka, Fla.

[73] Assignee: Carrier Corporation, Syracuse, N.Y.

[21] Appl. No.: 206,312

[22] Filed: Mar. 4, 1994

[51] Int. Cl.⁶ .................. G05D 23/00; F24F 7/00
[52] U.S. Cl. ...................... 237/2 B; 165/22; 236/49.3
[58] Field of Search ............ 237/2 B; 236/49.3; 62/175; 165/22, 29

[56] References Cited

U.S. PATENT DOCUMENTS

| | | | |
|---|---|---|---|
| 3,788,386 | 1/1974 | Demaray | 165/2 |
| 4,272,966 | 6/1981 | Niemann et al. | 62/180 |
| 4,406,397 | 9/1983 | Kamata et al. | 236/1 B |
| 4,716,957 | 1/1988 | Thompson et al. | 165/12 |
| 4,754,919 | 7/1988 | Otsuka et al. | 236/49 |
| 4,830,095 | 5/1989 | Friend | 165/22 |
| 4,928,750 | 5/1990 | Nurczyk | 165/2 |
| 5,025,638 | 6/1991 | Yamagishi et al. | 62/180 |
| 5,076,346 | 12/1991 | Otsuka | 165/22 |
| 5,305,953 | 4/1994 | Rayburn et al. | 236/49.3 |

Primary Examiner—William E. Wayner

[57] ABSTRACT

The temperature of the air leaving a heating coil is monitored for rising above a first threshold temperature value. An offset value is calculated for use in the positioning of each damper associated with a zone that is to be heated by air leaving the heating coil when the temperature of the air leaving the heating coil rises above the first threshold value. The offset value for each damper position is maintained until the temperature of the air leaving the heating coil drops below a second threshold temperature lower than the first threshold temperature. Any additional heating sources which also heat the air flowing over the heating coil are turned off immediately if the temperature of the air leaving the cooling coil rises above a third threshold value that is higher than the first threshold value.

16 Claims, 5 Drawing Sheets

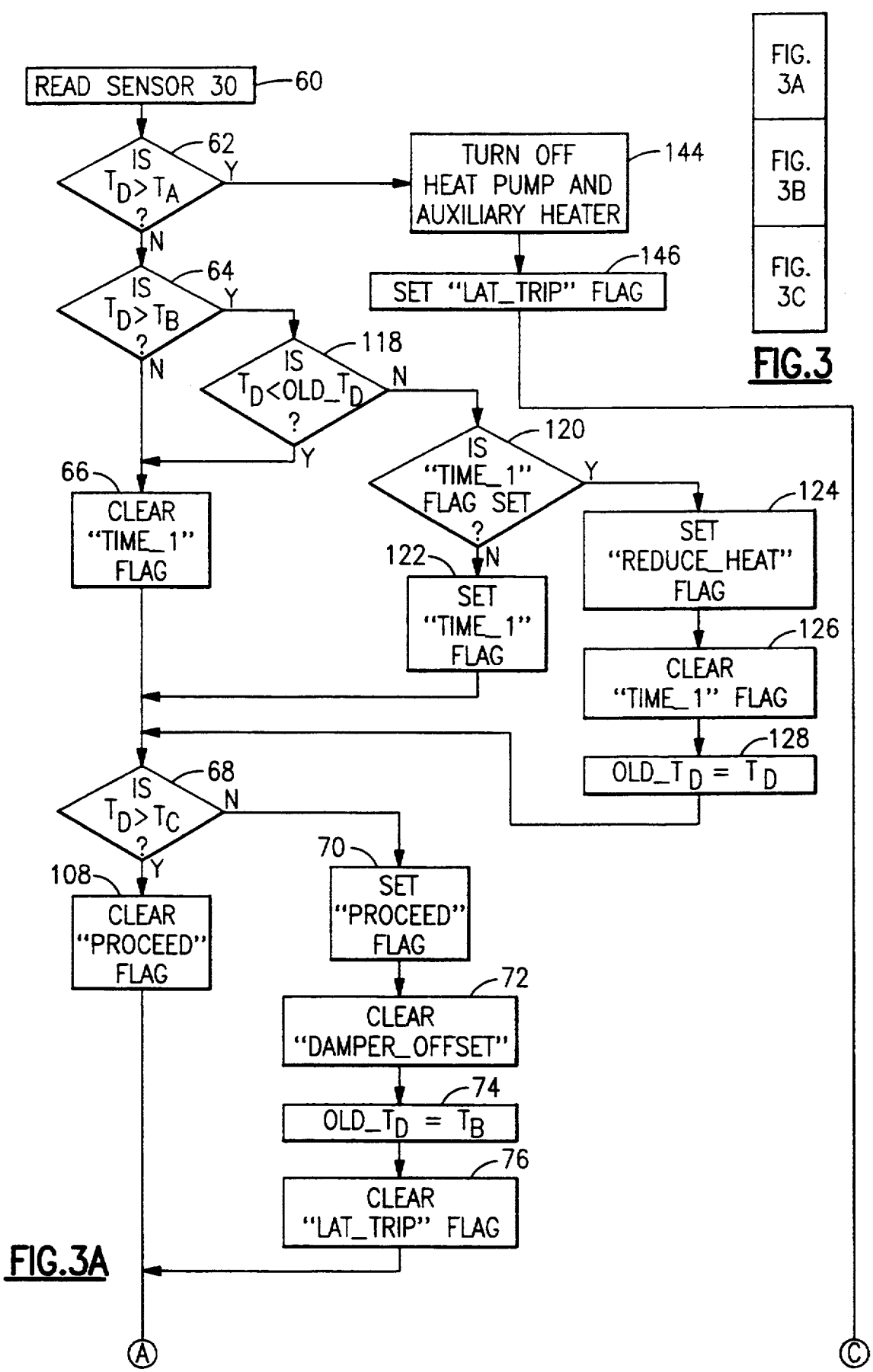

LEAVING AIR TEMPERATURE CONTROL OF HEATING SYSTEM

FIELD OF THE INVENTION

This invention relates to the control of a variable air volume system having one or more sources for heating the air and a plurality of individual dampers which govern the flow of the air to individual zones that are to be heated. In particular this invention relates to the control of the heating sources and the individual dampers when the temperature of the air leaving the heating sources rises above permissible levels.

Variable air volume systems having one or more heating sources which provide heated air to a plurality of individual zones in a home or office building via controlled dampers are well known in the art. The dampers in such systems are opened or closed in response to temperature conditions in each zone. In this regard, the damper for a given zone is typically moved to a more closed position when the temperature of the zone approaches the set point temperature for the zone. There may be times when most of the zones have reached their respective set point temperatures while demand is still being placed on the heating sources to provide heated air to perhaps only a few zones. In this situation, the heating sources may be heating returned air from the zones that is warmer than usual. This unusually warm air could pose a problem for the heat exchange elements associated with the heating sources. In particular, the heat exchange elements may not be able to dispense the amount of heat necessary to allow the heating source to operate properly. This may for instance occur with a heat pump when the heat exchange coil does not dispense an appropriate amount of heat. This in turn may cause premature failure of the heat pump system.

OBJECTS OF THE INVENTION

It is an object of the invention to provide a variable air volume system for heating multiple zones with a process for protecting the heat exchange element of a heating source when the air passing over the heat exchange element rises above permissible levels.

SUMMARY OF THE INVENTION

The above and other objects are achieved by a process which controls a plurality of dampers governing the flow of air to individual zones that are to be heated by possibly two heating sources. The process resides in a programmed microprocessor which monitors the temperature of the air leaving the heat exchange elements of the heating sources. The monitored temperature is compared with up to three separate temperature threshold values. The lowest threshold temperature allows the variable air volume system to operate in a normal fashion when the temperature of the air that has passed over the cooling coil is less than this value. The middle threshold temperature is an alert that the temperature of the air that has passed over the heat exchange elements has reached a level where the number of heating sources should be reduced to preferably one source of heating. All dampers in the variable air volume system are thereafter opened by at least a defined amount so as to alleviate the flow of air over the heat exchange element of the remaining source of heat. When pursuing this course of action, the control process first deactivates the additional heating source or sources and thereafter begins to define ever increasing amounts of opened damper position for each damper. Damper positions are continuously increased as long as the leaving air temperature remains above the middle threshold value and moreover continues to increase each time it is sensed. The thus opened dampers cannot be closed until the temperature of the air that has passed over the heat exchange elements drops below the lowest threshold value. Any demand for reactivation of the additional heating sources is also not permitted until the leaving air temperature drops below the lowest threshold value.

The highest temperature threshold value is an alert that the temperature of the air that has passed over the heat exchange elements has not been corrected by the deactivation of the second heating source and the opening of the dampers. In this event, the remaining active heating source is deactivated. Neither heating source may be reactivated until the temperature of the air that has passed over the heat exchange elements of these sources drops below the lowest threshold value.

BRIEF DESCRIPTION OF THE DRAWINGS

Other objects and advantages of the present invention will be apparent from the following description in conjunction with the accompanying drawings in which:

FIG. 3 shows the overall relationship between FIGS. 3A-3C.

FIGS. 3A-3C illustrates a process executed by the microprocessor for controlling the variable air volume system of FIG. 1 so as to avoid potentially damaging the heating sources.

DESCRIPTION OF THE PREFERRED EMBODIMENT

Figure 1:
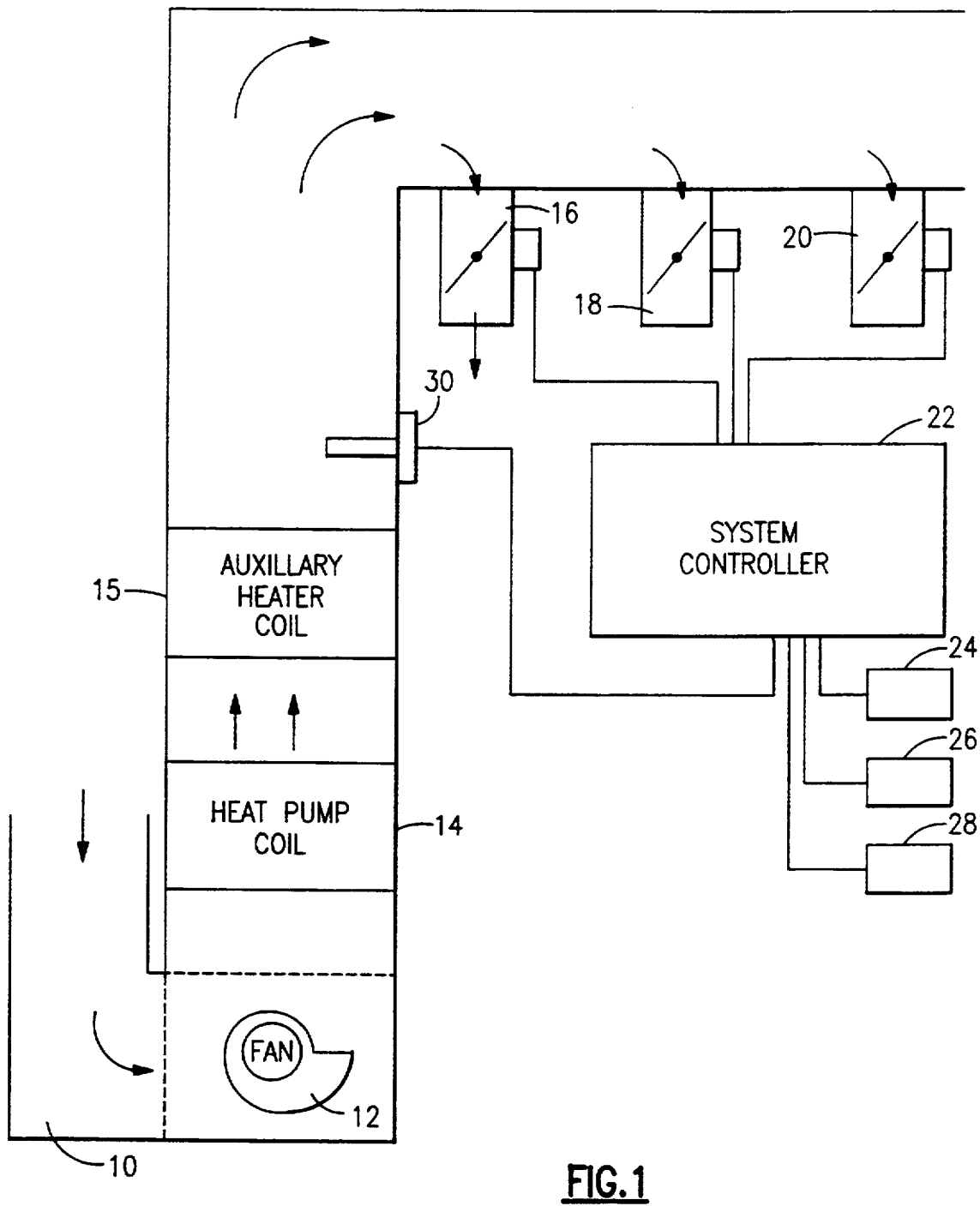
FIG. 1 is an overall diagram of a variable air volume system having a plurality of separate dampers providing heated air to various zones controlled by a single system controller.

Referring to FIG. 1, returning air from various temperature control zones is drawn into a return duct 10 by a fan 12 for subsequent flow over a heat pump coil 14 and an auxiliary heater coil 15. The heated air is thereafter provided to a number of temperature control zones via dampers 16, 18, and 20. These dampers are controlled by a system controller 22 which receives temperature readings from each zone via remote temperature sensors 24, 26, and 28. The system controller 22 also receives a temperature reading of the heated air leaving the auxiliary heater coil 15 via a temperature sensor 30.

Figure 2:
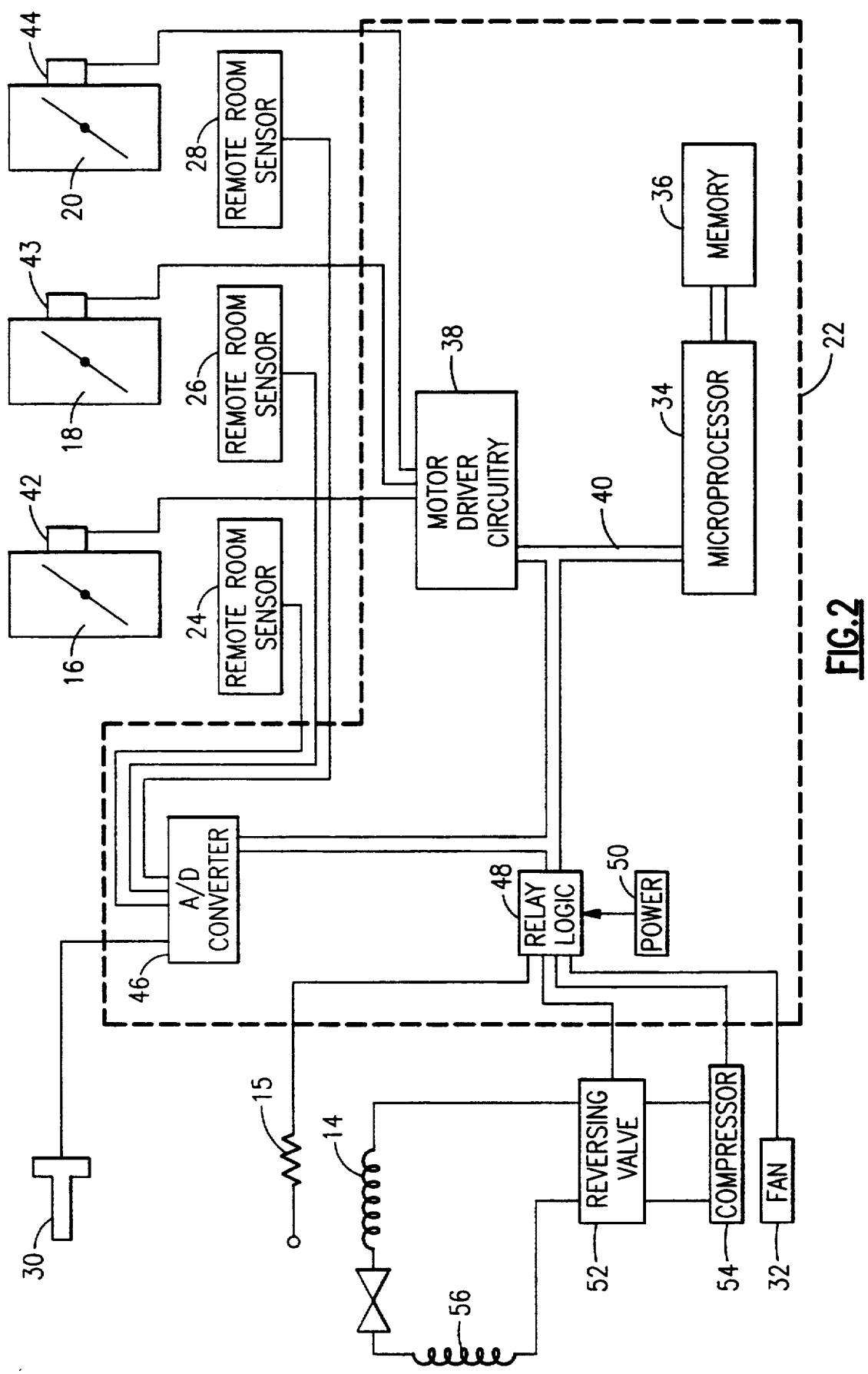
FIG. 2 is a more detailed diagram of the system controller which is seen to include a programmed microprocessor which controls two heating sources as well as the dampers of FIG. 1.

Referring now to FIG. 2, various elements of a heat pump system associated with the heat pump coil 14 are further illustrated relative to control elements of the system controller 22. These control elements include a microprocessor 34 interacting with a memory 36 associated therewith. The microprocessor 34 communicates with motor driver circuitry 38 via a communications bus 40. The motor driver circuitry 38 interfaces with damper motors 42, 43, and 44 that position dampers 16, 18, and 20. The microprocessor 34 also communicates with an A/D converter 46 which receives signals from the remote room sensors 24, 26, and 28 as well as the temperature sensor 30 downstream of the auxiliary heater coil 15. Communication is also established via the bus 40 with relay logic 48 which together with a power source 50 applies appropriate amounts of electrical current to the auxiliary heater coil 15 as well as a reversing valve 52 and a compressor 54 associated with the heat pump coil 14. It is to be appreciated that the compressor 54 is operative to compress refrigerant flowing in the heat pump loop comprising the heat pump coil 14 as well as a secondary coil 56. The direction of flow of the refrigerant depends on the orientation of the reversing valve 52 as defined by the relay logic 48 in response to appropriate signals from the microprocessor 34 via the bus 40.

Figure 3B:
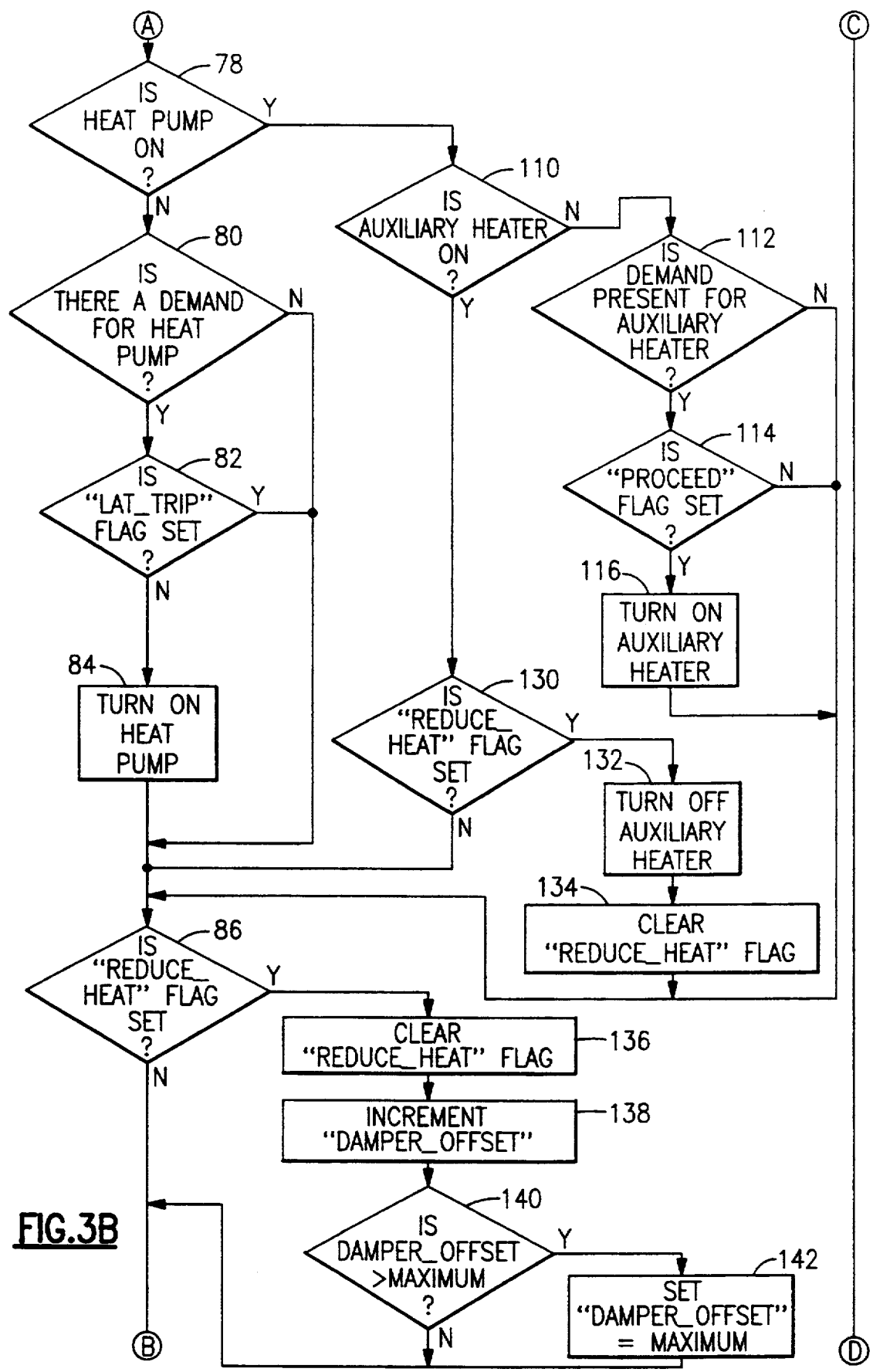
Figure 3C:
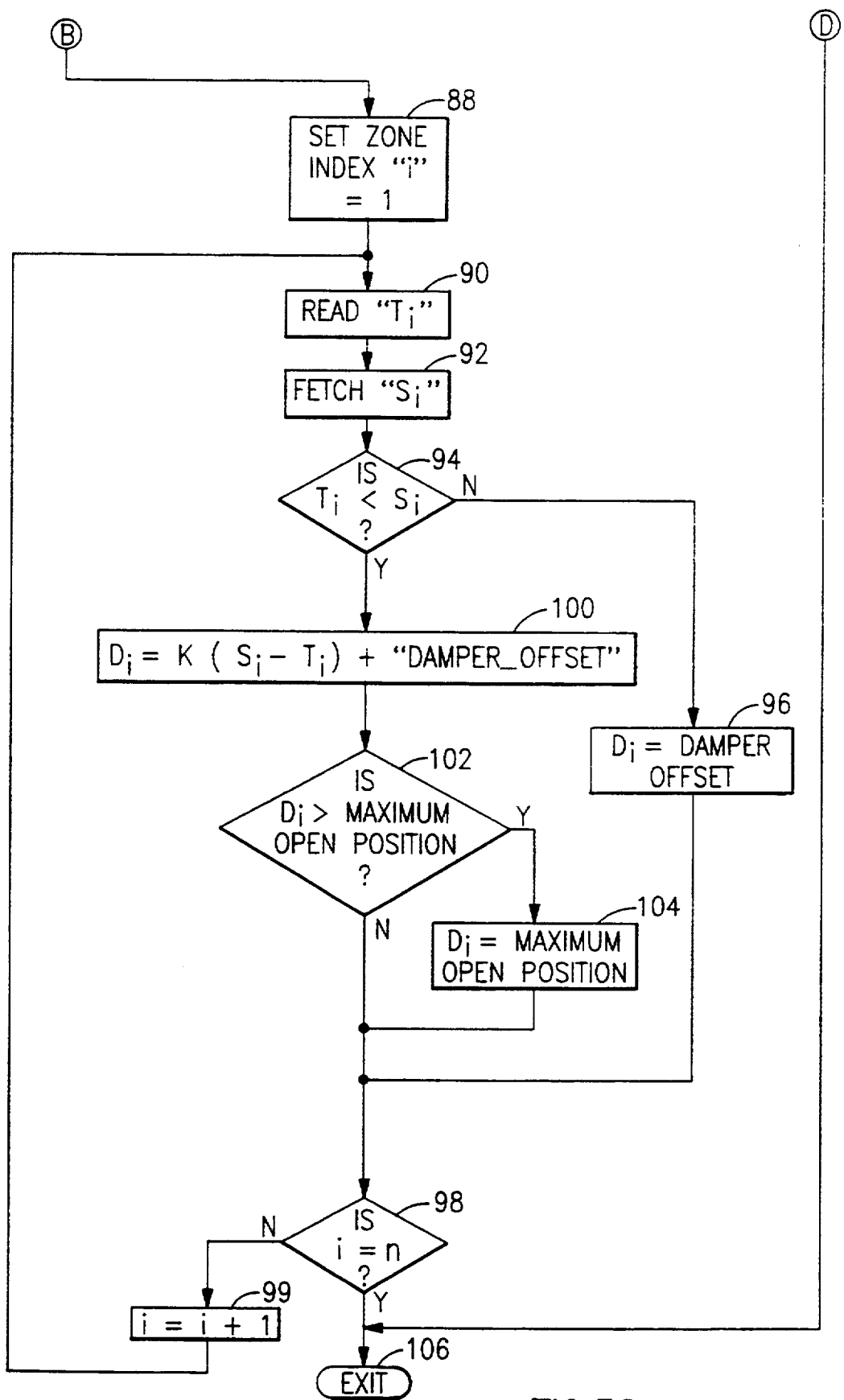

The microprocessor 34 executes various control processes stored in the memory 36. One such stored process monitors the temperature sensed by the temperature sensor 30 and provides appropriate control signals over the bus 40 to the relay logic 48, so as to thereby control the compressor 54 or the current passing through the auxiliary heater coil 15. The stored process also provides appropriate control signals over the bus 40 to the motor driver circuitry 38 so as to control the position of the dampers 16, 18, and 20. This stored process executable by the microprocessor 34 is illustrated in FIGS. 3A, 3B, and 3C.

Referring to FIG. 3A, the stored process begins with a step 60 wherein the duct temperature $T_D$ is read from the sensor 30. It is to be appreciated that the duct temperature $T_D$, is a reading of the temperature of the air leaving the heat exchange elements 14 and 15. As will be explained in detail hereinafter, this sensed temperature will be compared with three separate threshold temperature conditions stored in memory 36. These threshold temperatures will be referred to as $T_A$, $T_B$ and $T_C$. $T_A$ is the highest threshold temperature whereas $T_C$ is the lowest. $T_B$ is a threshold temperature between $T_A$ and $T_C$.

Normally, the duct temperature sensed by the sensor 30 should be below the lowest threshold temperature $T_C$. This will be the assumed initial temperature condition. Referring now to step 62, inquiry is first made as to whether the duct temperature $T_D$ is greater than $T_A$. Since the duct temperature will be below $T_A$, the microprocessor will proceed to a step 64 and inquire as to whether the duct temperature $T_D$ is less than the threshold temperature $T_B$. Since the duct temperature will be below $T_B$, the microprocessor will proceed to a step 66 and clear a "TIME 1" flag. The microprocessor will next proceed to a step 68 and inquire as to whether the duct temperature is less than the threshold temperature $T_C$. Since the duct temperature will be below the lowest threshold temperature $T_C$, the microprocessor will proceed along the no path to a step 70 and set a "PROCEED" flag in a step 70. The microprocessor will next clear a "DAMPER_OFFSET" variable in a step 72. Another variable "OLD_$T_D$" will be set equal to the threshold temperature $T_B$.

The microprocessor next proceeds to clear a "LAT_TRIP" flag in a step 76. Following the setting of the various variables in steps 70 through 76, the microprocessor proceeds to a step 78 and inquires as to whether the heat pump is on. If the compressor 54 of the heat pump has not been activated by the microprocessor 34, then an inquiry is made in a step 80 as to whether there is a demand for the heat pump. This is essentially a check of the results of other programs that may have been run by the microprocessor 34 to ascertain whether there is a demand to activate the compressor 54 of the heat pump. Activation of the compressor 54 is subject to the setting of the "LAT_TRIP" flag. In this regard, the microprocessor proceeds from step 80 to a step 82 to inquire as to whether the "LAT_TRIP" flag has been set if a heating demand has been noted in step 80. Since the "LAT_TRIP" flag was cleared in step 76, the microprocessor will proceed along the no path to a step 84 and turn on the compressor 54. The microprocessor will also have set the reversing valve 52 so as to cause the refrigerant to flow in the appropriate direction through the heat exchange coil 14.

The microprocessor will next proceed to a step 86 and inquire as to whether a "REDUCE_HEAT" flag is set. It is to be appreciated that this flag will initially not be set when the process is first executed. The microprocessor will accordingly proceed from step 86 to a step 88 and set a zone index "i" equal to one. It is to be appreciated that the zone index is an identifier of the various temperature zones having remote room sensors 24, 26 and 28 and dampers 16, 18 and 20 associated therewith. The microprocessor will proceed to a step 90 and read the temperature "$T_i$" for the room sensor identified by the particular numerical value of the zone index. The microprocessor will thereafter fetch the set point for that particular identified zone in step 92. An inquiry will next be made in step 94 as to whether the thus read zone temperature is less than the set point temperature for that particular zone. If the zone temperature is greater than or equal to the zone set point temperature, the microprocessor will proceed to a step 96 and set the damper position for the particular zone $D_i$ equal to the value of DAMPER_OFFSET. Since DAMPER_OFFSET is initially cleared in step 72 this will mean that the damper for the particular zone will be closed since a cleared DAMPER OFFSET is zero. The microprocessor will proceed from step 96 to a step 98 and inquire as to whether zone index, "i", equals "n". It is to be appreciated that "n" equals the total number of zones which is three for the configuration of FIG. 1. Assuming another zone is to be checked, the microprocessor increments the zone index "i" in step 99 and returns to read the temperature $T_i$ and set point $S_i$ for the new zone index value. In the event that the zone temperature $T_i$ is below set point, the microprocessor proceeds to a step 100 and calculates a new damper position $D_i$ for the particular damper associated with the identified zone. This calculation will include multiplying a constant k times the temperature difference $S_i$ minus $T_i$ plus adding the damper offset value thereto. The constant k is the number of incremental positions per degree that the dampers 16, 18 and 20 are to move. The microprocessor proceeds to a step 102 and inquires as to whether the calculated damper position $D_i$ is greater than the maximum allowable position. The damper position is set equal to the maximum allowable in step 104 in the event that the calculated damper position is greater than the maximum allowable. The microprocessor proceeds to step 98 and inquires whether all zone indexes have been checked for temperatures and appropriate damper position calculations performed. When all zone indexes have been thus addressed, the microprocessor proceeds to a step 106 and exits the particular process of FIGS. 3A through 3C.

It is to be appreciated that the microprocessor will preform other tasks before returning to the process of FIGS. 3A through 3C. The re-execution of the process of FIGS. 3A through 3C will preferably occur within a time period that allows for the process of FIGS. 3A through 3C to be re-executed in a timely manner. It is to be appreciated that this time may vary from system to system. Repeating the process every ten seconds is sufficient for the configuration of FIGS. 1 and 2.

Referring again to step 60, following the appropriate time interval, the microprocessor will again read the value $T_D$ of the sensor 30. For purposes of discussion, the duct temperature $T_D$ will be assumed to be greater than the threshold temperature $T_C$ but less than the threshold temperature $T_B$. This will prompt the microprocessor to proceed through steps 62, 64 and 66 to step 68. Since the duct temperature is greater than the threshold temperature $T_C$, the microprocessor will proceed from step 68 to a step 108 and clear a "PROCEED" flag. The microprocessor will move from step 108 to step 78 and inquire as to whether the heat pump is on. Since the heat pump is now on, the microprocessor will proceed to a step 110 and inquire as to whether the auxiliary heater is on. Since the auxiliary heater is not yet on, the microprocessor will proceed to a step 112 and inquire as to whether a demand is present for the auxiliary heater. This is a check as to whether another control process that has been run by the microprocessor 34 has demanded an activation of the auxiliary heater. Assuming a demand to be present, the microprocessor will proceed to a step 114 and inquire as to whether the "PROCEED" flag has been set. It will be remembered that the "PROCEED" flag will have been cleared in step 108 since the duct temperature is now greater than the threshold temperature $T_C$. Since the duct temperature is greater than this threshold temperature, the microprocessor will proceed along the no path and not allow the auxiliary heater to be activated. It is however to be appreciated that if the duct temperature were less than the threshold temperature $T_C$, then the "PROCEED" flag would have been appropriately set in step 70 and the microprocessor would be able to proceed from step 114 to a step 116 and turn on the auxiliary heater.

The microprocessor proceeds from either step 114 along the no path or from step 116 to step 86 and inquires as to whether the "REDUCE_HEAT" flag is set. Since the "REDUCE HEAT" flag has yet to be set, the microprocessor proceeds to step 88 and reads temperature and set points and updates any damper positions in steps 90 through 104 before exiting in step 106.

The microprocessor again executes other control processes before again returning to step 60 to read the temperature sensor 30. It will now be assumed that the duct temperature has risen above the threshold temperature $T_B$. The microprocessor accordingly pursues the yes path out of step 64 and inquires in a step 118 as to whether the present duct temperature $T_D$ is less than an old duct temperature value stored in the variable "OLD_$T_D$". It will be remembered that the value of the variable "OLD_$T_D$" is equal to the threshold temperature $T_B$ as result of step 74. Since the duct temperature will have risen above this value of "OLD_$T_D$", the microprocessor will proceed along the no path from step 118 to a step 120 and inquire as to whether a "TIME_1" flag has been set. This particular flag will initially be clear when the microprocessor 34 is first powered up. This means that the microprocessor will proceed from step 120 to a step 122 and set this "TIME_1" flag. The microprocessor will proceed through the various steps that have been heretofore described and eventually exit from the process in step 106.

The process of FIGS. 3A through 3C will again be executed in a timely fashion and the duct temperature $T_D$ will again be read in step 60. Assuming that the duct temperature remains above the threshold temperature $T_B$, the microprocessor will proceed along the yes path out of step 64 and along the no path out of step 118 to step 120. This time, the "TIME_1" flag will have been set prompting the microprocessor to proceed along the yes path out of step 122 to a step 124 wherein the "REDUCE_HEAT" flag is set. The "TIME_1" flag is cleared in step 126 and the variable "OLD_$T_D$" is set equal to the current value of duct temperature in step 128. The microprocessor will next proceed to step 78 and again inquire as to whether the heat pump is on. In the event that the heat pump is on, the microprocessor will proceed to step 110 and inquire as to whether the auxiliary heater is also on. If the answer is yes, the microprocessor proceeds to a step 130 and inquires as to whether the "REDUCE_HEAT" flag has been set. Since "REDUCE_HEAT" flag was set in step 124, the microprocessor will proceed to a step 132 and turn off the auxiliary heater. It is to be appreciated that this will only have occurred when the temperature rises above the threshold temperature $T_B$, causing the "TIME_1" flag to be set and thereby causing the microprocessor to completely execute the process of FIGS. 3A through 3C another time before again returning to step 120.

Following deactivation of the auxiliary heater 34 in step 132, the microprocessor proceeds to step 134 and clears the "REDUCE_HEAT" flag. The microprocessor will again execute steps heretofore described and exit the process of FIGS. 3A through 3C in step 106.

Assuming the duct temperature remains above the threshold temperature $T_B$ when the microprocessor again executes the control process of FIGS. 3A through 3C, the microprocessor will proceed along the yes path out of step 64 to step 118. Assuming that the duct temperature has furthermore risen relative to its previous value stored in "OLD_$T_D$" the microprocessor will proceed along the no path out of step 118 and the no path out of step 120 so as to again set the "TIME_1" flag. Following the setting of the "TIME_1" flag, the microprocessor will proceed through the various steps as have been theretofore described and exit from the step 106.

Assuming the temperature $T_D$ remains above the threshold temperature $T_B$ and also rises relative to "OLD_$T_D$", the microprocessor will again execute the process of reading the duct temperature in step 60 and proceed through step 64 and through step 118 and proceed along the yes path out of step 120 to set the "REDUCE_HEAT" flag in step 124. The "TIME_1" flag will again be cleared in step 126 and the variable "OLD_$T_D$" will be set equal to the value of the current duct temperature in step 128. The microprocessor will proceed through steps 68 through 78 and along the yes path out of step 78 to step 110 wherein it will be noted that the auxiliary heater has already been turned off. The no path will be pursued to a step 112 and inquiry will be made whether there is a demand for the auxiliary heater. If demand is present, the microprocessor proceeds to step 114 and inquires whether the "PROCEED" flag is set. It is to be appreciated that the only way the "PROCEED" flag would be set is if the temperature $T_D$ were equal to or below the threshold temperature $T_C$. The microprocessor will hence proceed along the no paths out of either step 112 or step 114 without turning the auxiliary heater on. The microprocessor proceeds to step 86 and inquires as to whether the "REDUCE_HEAT" flag is set. Since the "REDUCE_HEAT" flag will have been set in step 124 as a result of the second time through of executing the process following the deactivation of the auxiliary heater, the microprocessor will proceed to step 136 and first clear the "REDUCE_HEAT" flag. The microprocessor will proceed to step 138 and increment the current value of "DAMPER_OFFSET". The increment will preferably be one damper position. Inquiry is next made in step 140 as to whether the value of "DAMPER_OFFSET" is greater than a maximum allowable value. It is to be appreciated that the maximum allowable value for this variable can be any arbitrary number of incremental damper positions. This maximum value should be the amount that the damper is allowed to be opened to compensate for the denoted temperature condition that has prompted the damper offset calculation to be initiated. This maximum value could for instance be set equal to one half of the total incremental damper positions possible for any one of the dampers 16, 18 or 20. If this number is exceeded in step 140, the microprocessor proceeds to a step 142 and sets the "DAMPER_OFFSET" variable equal to the maximum allowed value. The microprocessor either proceeds out of step 140 or step 142 with an appropriate offset damper value and proceeds to step 88 wherein the zone index "i" is set equal to one. The temperature for the zone indicated by the particular index setting "i" is compared with the set point temperature for that zone in step 94. If the temperature $T_i$ for the particular zone is above set point, then the damper position will be set equal to the calculated DAMPER_OFFSET value in step 96. On the other hand, if the zone temperature $T_i$ is equal to or greater than set point, then the microprocessor will proceed to calculate the new damper position based on the noted temperature differential as well as adding the DAMPER OFFSET value previously calculated. The microprocessor will proceed to inquire as to whether the damper position is at its maximum allowable open position and make the appropriate correction if necessary in step 104 before inquiring as to whether the last zone has been updated for damper position in step 98. When each zone has thus been updated the microprocessor will exit the process in step 106.

It is to be appreciated that the "DAMPER_OFFSET" variable may be incremented every other time the process of FIGS. 3A through 3C is executed. This is of course due to the necessity of first setting the "TIME_1" flag and then subsequently setting the "REDUCE_HEAT" flag the next time through as long as "$T_D$" continues to rise relative to "OLD $T_D$". Providing the above conditions continue, the microprocessor will proceed to calculate a new value for "DAMPER_OFFSET" in steps 138 through 142. In this manner, the value of DAMPER_OFFSET may potentially increment to the maximum allowable DAMPER_OFFSET value in an attempt to correct the increasing temperature condition sensed by the temperature sensor 30. The thus opened dampers will allow more air to enter each zone than would otherwise be permitted by a normal damper control response to the room temperature versus the set point for that particular room. This damper opening should eventually alleviate the duct temperature condition occurring upstream at the heat exchange coil 14 and the auxiliary heater coil 15.

If the duct temperature however continues to rise and more over rises above the threshold temperature $T_A$, then the microprocessor will so note this situation in step 62. The microprocessor will proceed from step 62 to a step 144 and turn off both the heat pump and the auxiliary heater. After the cooling stages 32 and 34 have been turned off the microprocessor proceeds to a step 146 and sets a "LAT TRIP" flag in a step 146 before proceeding to the exit step 106.

It is to be appreciated that the process of FIGS. 3A through 3C will be executed repeatedly with no further action taken until the duct temperature drops below the threshold temperature $T_A$. At such time, the microprocessor will implement the various courses of action dictated by the duct temperature being first greater and than less than the threshold temperature $T_B$. If the air temperature finally drops below the threshold temperature $T_C$, the microprocessor will so note in step 68. The "DAMPER OFFSET" will subsequently be cleared in step 72 and the "LAT_TRIP" flag will be cleared in step 76.

It is to be appreciated that the heat pump and auxiliary heater as well as the associated dampers will be allowed to operate in a normal fashion as long as the duct temperature downstream of the coils 14 and 15 remains lower than the threshold temperature $T_C$. At such temperatures, the microprocessor will be allowed to turn on the auxiliary heating stage in the event that it is not presently running.

If the duct temperature again rises above the threshold temperature $T_B$, the microprocessor will deactivate the auxiliary heater following at least a second execution of the process due to the "TIME_1" flag setting routine. The microprocessor will also begin to open the dampers 16, 18 and 20 after having deactivated the auxiliary heater in the event the sensed temperature downstream of the coils 14 and 15 continues to rise. If the temperature rises above threshold temperature $T_A$, then the microprocessor immediately deactivates both the heat pump and auxiliary heater.

It is to be appreciated that a particular embodiment of the invention has been described. Alterations, modifications and improvements thereto will readily occur to those skilled in the art. Such alterations, modifications and improvements are intended to be part of this disclosure even though not expressly stated herein and are intended to be within the scope of the invention. Accordingly the foregoing description is by way of example only and the invention is to be limited only by the following claims and equivalents thereto.

What is claimed is:

1. A process for controlling the positioning of dampers within a variable air volume system in response to a sensing of the temperature of the air being supplied to the dampers, said process comprising the steps of:

sensing the current temperature of the air downstream of a heating element which heats the air being supplied to the dampers;

comparing the sensed current temperature of the air to a first threshold temperature value;

comparing the sensed current temperature with a previously sensed temperature of the air when the sensed current temperature is greater than the first threshold temperature value;

calculating an offset value that is to be used in adjusting the position of each damper when the sensed current temperature is greater than the previously sensed temperature of the air; and adjusting the position to be commanded of each damper using the calculated offset value.

2. The process of claim 1 further comprising the step of:

repeating said steps of sensing current temperature, comparing the sensed temperature with a first threshold temperature value and comparing the sensed current temperature with a previously sensed temperature before proceeding to said step of calculating an offset value.

3. The process of claim 2 further comprising the steps of:

storing the sensed current temperature as the previously sensed temperature after said step of comparing the sensed current temperature with a previously sensed temperature whereby the previously sensed temperature is the immediately previous sensed current temperature when said step of comparing the sensed current temperature with a previously sensed temperature is repeated.

4. The process of claim 3 further comprising the steps of:

repeating after said step of adjusting the position of each damper, said steps of sensing the current temperature of the air downstream of the heating element, comparing the sensed current temperature of the air to a first threshold temperature value; and comparing the sensed current temperature with the previously sensed temperature when the sensed temperature is above a previously sensed temperature;

incrementing the previously calculated offset value when the sensed temperature is below the previously sensed temperature; and checking whether the incremented offset value exceeds the maximum allowable offset value before proceeding to said step of adjusting the position to be commanded of each damper.

5. The process of claim 1 further comprising the steps of:

comparing the sensed current temperature with a second threshold temperature value which is less than the first threshold temperature value; and clearing the calculated offset value when the sensed current temperature is less than the second threshold temperature value.

6. The process of claim 1 wherein the variable air volume system includes at least two sources of heating and wherein said process includes the further step of:

checking whether the two sources of heating are on after said step of comparing the sensed temperature with a previously sensed temperature; and reducing the number of heating sources if at least two sources of heating are on; and repeating said steps of sensing current temperature, comparing the sensed temperature with a first threshold value and comparing the sensed current temperature with a previously sensed temperature before proceeding to said step of calculating an offset value.

7. The process of claim 6 further comprising the steps of:

comparing the sensed current temperature with a second threshold temperature which is greater than the first threshold temperature;

turning off all sources of heating if the sensed current temperature is greater than the second threshold temperature.

8. The process of claim 7 further comprising the steps of:

comparing the sensed current temperature with a third threshold temperature value which is less than the first threshold temperature value; and clearing the calculated offset value when the sensed current temperature drops below the third threshold temperature value.

9. The process of claim 8 further comprising the step of:

allowing the heating sources to be turned on again when the sensed current temperature drops below the third threshold temperature value.

10. The process of claim 1 wherein said step of adjusting the position to be commanded of each damper comprises the steps of:

sensing the temperature of each space to be heated by the air flowing through a damper associated with the space;

comparing the sensed temperature of each space with a set point temperature for the space; and setting the commanded position of the damper associated with each space equal to the calculated offset value when the sensed temperature is greater than the set point temperature for the space.

11. The process of claim 10 wherein said step of adjusting the position to be commanded of each damper further comprises the step of:

calculating a damper position value based on the difference between the sensed temperature of a space and the set point temperature of the space when the sensed temperature is less than the set point temperature for the space; and setting the commanded position of the damper associated with the space equal to the calculated damper position plus the offset value when the sensed temperature of the space is less than the set point temperature for the space.

12. A system for controlling the positioning of dampers within a variable air volume system having a heating element for heating the air being supplied to the dampers, said system comprising:

a plurality of motors, each motor associated with a respective damper;

drive circuitry associated with each motor for providing current to the drive motors so as to position the dampers;

a sensor located downstream of the heating element and upstream of the dampers so as to measure the temperature of the air leaving the heating element;

a processing unit connected through an interface to said sensor and furthermore being connected to said drive circuitry, said processor having a memory unit associated therewith; said memory unit including a stored program executable by said processing unit, said stored program including an instruction for comparing a temperature sensed by said sensor with a first threshold temperature value, an instruction for comparing the sensed current temperature with a previously sensed temperature, an instruction for calculating an offset value that is to be used by said motor driver circuitry and said motors to adjust the position of each damper when the sensed temperature is greater than a previous temperature sensed by said sensor.

13. The system of claim 12 wherein said memory unit further includes:

an instruction for comparing the current temperature sensed by said sensor with a second threshold temperature value; and an instruction for clearing the calculated offset value when the current temperature sensed by said sensor drops below the second threshold temperature value.

14. The system of claim 12 wherein said air is heated by at least two heating sources each having respective heat exchange element for heating the air and wherein said memory unit includes:

an instruction for checking whether two or more heating sources are on when said instruction for comparing sensed temperature with a previously sensed temperature indicates the sensed temperature is greater than the previously sensed temperature; and an instruction for reducing the number of heating sources if at least two heating sources are on when the sensed temperature is less than the previously sensed temperature.

15. The system of claim 14 wherein said memory unit further includes:

an instruction for comparing the sensed temperature with a second threshold temperature which is less than the first threshold temperature; and turning off all stages of heating sources if the current temperature sensed by said sensor is greater than the second threshold temperature.

16. The system of claim 14 wherein said memory unit further includes:

an instruction for comparing the sensed current temperature with a third threshold temperature which is less than the first threshold value; and an instruction for clearing the calculated offset value when the current temperature sensed by said sensor is less the third threshold temperature value.

* * * * *